(12) United States Patent
Aw et al.

(10) Patent No.: US 6,645,665 B2
(45) Date of Patent: Nov. 11, 2003

(54) BATTERY RETAINER

(75) Inventors: Chee Seng Aw, Singapore (SG);
Christoper Leitao, Glen Waverley (AU); Eng Seng Lim, Singapore (SG); David Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

(21) Appl. No.: 09/838,945

(22) Filed: Apr. 20, 2001

(65) Prior Publication Data

US 2002/0022176 A1 Feb. 21, 2002

(30) Foreign Application Priority Data

Aug. 11, 2000 (SG) ........................................ 200004432-1

(51) Int. Cl.[7] ................................................ H01M 2/10
(52) U.S. Cl. ........................ 429/100; 429/97; 429/123
(58) Field of Search .............................. 429/96, 97, 98, 429/99, 100, 123

(56) References Cited

U.S. PATENT DOCUMENTS 4,371,594 A  *  2/1983  Ohara et al. .................. 429/97
4,993,973 A  *  2/1991  Selinko ......................... 439/627
5,922,489 A      7/1999  Adachi .......................... 429/100

FOREIGN PATENT DOCUMENTS

JP         56168355 A   *  12/1981  ............. H01M/2/10
JP         06158353 A   *  6/1994   ............. C23C/28/02

* cited by examiner

*Primary Examiner*—Patrick Ryan
*Assistant Examiner*—Gregg Cantelmo

(57) ABSTRACT

The invention provides a battery retainer for retaining a battery comprising a positive electrode and a negative electrode, the battery retainer comprising a positive terminal for contacting the positive electrode of the battery, a negative terminal for contacting the negative electrode of the battery, a receiving chamber designed to be adapted to receive a battery and being open at the top, a pivotable retaining arm located at the top of the receiving chamber and designed and arranged to hold a battery received in the receiving chamber therein, and a spring element located at the bottom of the receiving chamber and designed and arranged to at least partly eject the battery received in the receiving chamber therefrom upon a pivotal movement of the pivotable retaining arm off the battery.

4 Claims, 2 Drawing Sheets

BATTERY RETAINER

FIELD OF THE INVENTION

The present invention relates to a battery retainer for retaining a battery.

BACKGROUND OF THE INVENTION

In the prior art, several ways of holding a battery in a battery retainer are known.

In particular, it is known to retain circular-disk shaped coin batteries 102 in a corresponding cylindrical chamber 101 of a device D by a friction fit (FIGS. 1, 2 and 3). One drawback of such a friction fit is that removal of the battery from the chamber is difficult and must be performed by means of a tool, e.g. a ballpoint pen. Further, the friction fit will wear over time so that, when the device is turned upside down or is exposed to vibrations, the battery can drop out, or the electric contact with the battery can be lost.

According to a further known battery retainer a coin battery 102 is retained in a corresponding chamber 101 by means of a side spring 103 exerting a lateral force upon the battery 102.

A further known method for holding a battery in place in a device is to place the battery 102 in a cavity 101 and to place a cover 104 over the battery 102 so as to ensure retention of and electric contact with the battery (FIGS. 2, 3 and 4). This method has the drawback that the device D can be turned over to check for proper operation only when the cover 104 is placed over the battery. Further, the battery is difficult to remove. A similar known method with the same inherent drawbacks is to use, instead of the cover 104, a metal slide bar 105 which can be slid over the battery 102 to hold it down in the cavity 101 and which serves as an electric battery contact.

For both the friction-type and the side spring-type battery holder a cover 104 or a slide bar 105 is usually required for ensuring electric contact with the battery.

U.S. Pat. No 5,922,489 discloses a module-type battery holder comprising a bottom, the battery holder being open to the top, and in which a battery holder is held/forced down to the bottom by a retainer at its one side and by a removing flange for battery removal at its other side. A fulcrum is provided on the bottom between the retainer and the removing flange, which fulcrum contacts an inserted battery from a position under and near its center. For inserting the battery, one end of the battery is slipped over the fulcrum and under the removing flange, and then the other end of the battery is pressed down, so as to be forced under the retainer, while the battery pivots around the fulcrum. For removing the battery, the removing flange and, with it, the end of the battery below the flange is pressed down so that the battery pivots around the fulcrum and the opposite end of the battery pops up from below the retainer. However, this prior art battery holder has several drawbacks. The battery holder of U.S. Pat. No. 5,922,489 requires the use of many parts in a complicated arrangement. This renders the battery holder expensive and susceptible to damage and malfunction. Furthermore, due to its complex design, the battery holder has to be provided as an isolated module, but cannot be simply incorporated into a device.

It is therefore an object of the present invention to provide a battery retainer, in particular for coin batteries, having a simple design, thereby providing safe and reliable retention and safe and reliable electric contact with the battery while at the same time allowing simple and easy insertion and removal of the battery.

SUMMARY OF THE INVENTION

The objects of the present invention are achieved by a battery retainer for retaining a battery having a positive electrode and a negative electrode, the battery retainer having a positive terminal for contacting the positive electrode of the battery, a negative terminal for contacting the negative electrode of the battery, a receiving chamber designed to receive a battery and being open at the top, a pivotable retaining arm located at the top of the receiving chamber and designed and arranged to hold a battery received in the receiving chamber therein, and a spring element located at the bottom of the receiving chamber and designed and arranged to at least partly eject the battery received in the receiving chamber therefrom upon a pivotal movement of the pivotable retaining arm off the battery.

The battery retainer described above has the advantage that a battery inserted thereto is safely and reliably retained. When a battery to be retained is received in the receiving chamber, the pivotable retaining arm is positioned above the battery and prevents the battery from falling out of the receiving chamber.

A further advantage of the battery retainer of the present invention is that a battery received in the receiving chamber can easily be removed therefrom. The spring element at the bottom of the receiving chamber is located below the received battery and tends to push the battery upwards against the action of the pivotable retaining arm. When the pivotable retaining arm is pivoted off of the battery, the battery pops out of the receiving chamber by the action of the spring element, or is at least lifted to an extent that it can easily be removed.

The design of the battery retainer of the present invention is very simple. Apart from a receiving chamber for receiving a battery and from a positive and a negative terminal for contacting the battery, only a retaining arm for retaining the battery and a spring element for ejecting the battery are required.

The spring element can be a coil or a plate spring or an arrangement of several such springs. It can for example be a single plate spring made of 0.06 mm spring steel. However, any other suitable kind of spring element and any other suitable material can be used.

Preferably, the negative or/and the positive electrode/s is/are used as the spring element. This further simplifies the design of the battery retainer. In this case, the corresponding electrode/s can have the shape of plate springs, e.g. made of 0.06 mm spring steel.

The electrodes can be nickel-plated to prevent corrosion.

If the electric terminals are used as the spring element, a battery received in the receiving chamber is automatically contacted as soon as the battery is fully received therein, since the battery is squeezed between the retaining arm and the spring element, i.e. the terminals. Hence the reliability of the electric battery contact is especially high.

To further increase its reliability, the battery retainer of the present invention can further include a static retention element located at the top of the receiving chamber, wherein the pivotable retaining arm and the static retaining element are located near opposite edges of the top of the receiving chamber. By this, the battery is fixed from the top at two separate points. Hence, an even more reliable protection against tilting of the battery is provided. Thus, also a more reliable electric contact is provided.

The receiving chamber can be a separate module. However, if the battery retainer is used in an electric device, the receiving chamber is preferably incorporated into the device, e.g. into its housing so as to further simplify the design of the battery retainer.

There are several possible designs for the pivotable retaining arm.

For example, the pivotable retaining arm can include an elongated arm pivotably connected to or near a side wall of the receiving chamber by a hinge, wherein the pivotable retaining arm is pivotable between a closed position, in which a battery received in the receiving chamber is retained by the elongated arm, and an open position, in which insertion and removal of a battery into or from, respectively, the chamber is allowed.

In this latter case, the pivotable retaining arm preferably further includes a locking mechanism by which the elongated arm is lockable in the closed position and in the open position or a friction mechanism by which the elongated arm is fixable in any position from the closed position to the open position.

Any plastic or metal or other material is possible for the retaining arm as long as no short circuit is generated.

However, the retaining arm preferably is designed to be pivotable by an elastic deformation of the same, since this allows a particularly simple design.

A possible material for the pivotable retaining arm in this latter case is polycarbonate.

The receiving chamber of the battery retainer can have any suitable shape and is preferentially adapted to the shape of the battery to be retained therein. For receiving a flat circular-cylindrical coin battery the receiving chamber preferably has a shape of a cylinder having an essentially circular cross section and is delimited by a cylindrical outer wall.

The shape of the pivotable retaining arm is to some extent freely choosable. The only restriction is that the retaining arm must be suited to assuming a first position in which it retains a battery received in the receiving chamber and a second position in which the battery can be removed from the receiving chamber or be inserted thereto. Preferably the shape of the pivotable retaining arm is adapted to the shape of the receiving chamber so that the retaining arm occupies only little space.

For insertion and removal of a battery, the pivotable retaining arm is radially pivotable off the center of the battery chamber with respect to a cross section of the battery chamber to at least an extent that the battery can be inserted or removed, respectively.

For a receiving chamber having a shape of a cylinder having a basically circular cross section and being delimited by a cylindrical outer wall, the pivotable retaining arm preferentially has a curved shape corresponding to the curved shape of the outer wall and is radially offset from the outer wall towards the center of the battery chamber with respect to the circular cross section, wherein, for insertion and removal of a battery, the pivotable retaining arm is radially pivotable off the center of the battery chamber with respect to the circular cross section to at least an extent that the battery can be inserted or removed, respectively.

Therein the receiving chamber has a diameter being about equal to a diameter of a battery received in the chamber. The pivotable retaining arm protrudes off the outer wall of the receiving chamber towards the center of the chamber. The battery is thereby retained in the receiving chamber by the pivotable retaining arm. For removal or insertion of the battery the retaining arm is pivoted around the hinge or is elastically bent into an outward direction until it no longer protrudes into the chamber, so that the battery can be removed or inserted.

In more detail, the retaining arm can have a shape of a simple curved bar having for example a circular or an elliptical or a square or a rectangular or a more complicated cross section.

Preferably, the pivotable retaining arm includes an elongated part being fixed to the outer wall at its one end and being freely movable at its other end, and a wedged portion provided at the free end of the elongated part. Of the pivotable retaining arm, only the wedged portion is offset from the outer wall towards the center of the battery chamber with respect to the circular cross section. The elongated part, however, is preferably flush with the outer wall.

The wedged portion has a sloping top surface radially sloping towards the center of the receiving chamber with respect to the circular cross section, and a flat bottom surface for retaining a received battery, wherein the sloping top surface transforms a static force exerted upon it into a radial pivotal movement of the retaining arm radially off the radial center of the receiving chamber.

Thus a battery can be pushed into the receiving chamber from the top using a single finger, wherein the retaining arm is automatically bent outwards.

For removing the battery, the push part is pressed from the top so that the retaining arm is bent outwards, and as a result the battery will jump out or be partly lifted by the action of the spring element.

DETAILED DESCRIPTION OF THE PREFERRED EMBODIMENT

In the following, a preferred embodiment of the present invention will be described with reference to the drawings.

Figure 1:
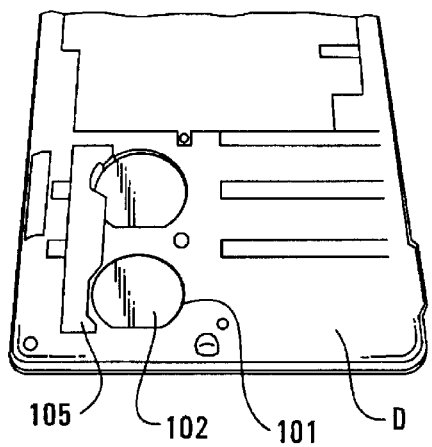
FIG. 1 shows an electric device comprising a prior art friction fit type coin battery holder using a metal slide bar.
Figure 2:
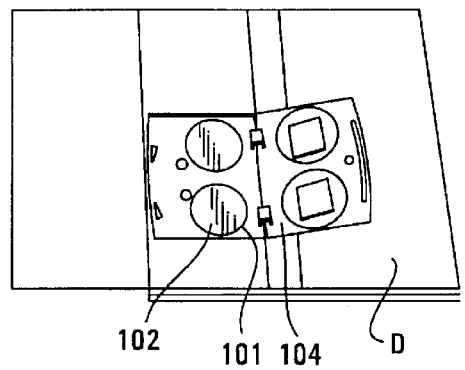
FIG. 2 shows an electric device comprising a prior art friction fit type coin battery holder using a cover.
Figure 3:
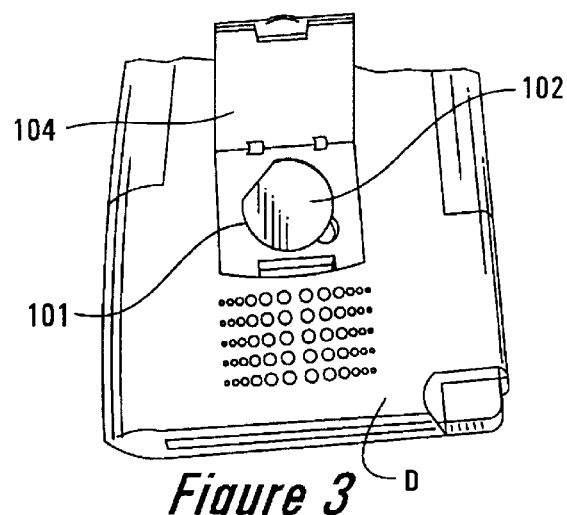
FIG. 3 shows an electric device comprising a further prior art friction fit type coin battery holder using a cover.
Figure 4:
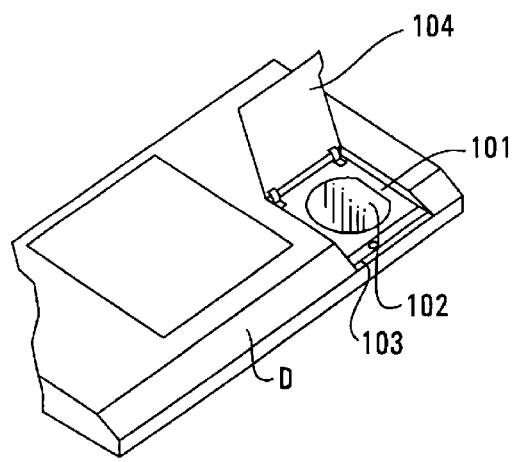
FIG. 4 shows an electric device comprising a prior art side spring type coin battery holder using a cover.
Figure 5:
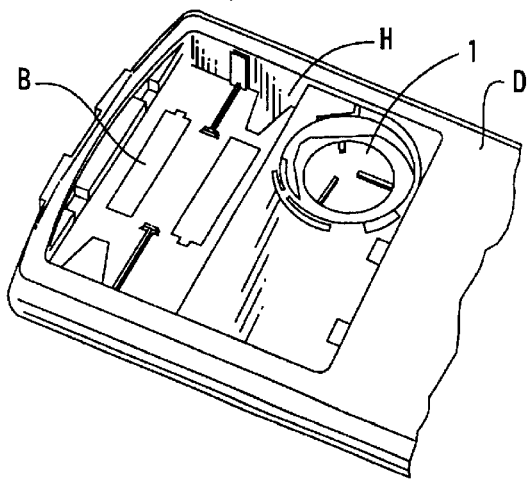
FIG. 5 shows a bottom view of an electric device having a battery retainer according to a preferred embodiment of the present invention, without a battery being received therein.

FIG. 5 shows a bottom view of an electric device D including a housing H with an incorporated battery retainer 1 therein according to a preferred embodiment of the present invention, without a battery being received therein. The housing H further includes a further battery holder B for retaining two AA batteries. The battery holder is also incorporated into the housing H. Preferably the housing is cast of a plastic material such as a resin as one single unit, wherein the battery holder H and the battery retainer 1 are incorporated into the housing H. Alternatively the housing can include a battery housing part forming only part of the housing H, wherein the battery holder H and the battery retainer 1 are incorporated into the battery housing part. Of course, instead of or in addition to the battery holder for AA batteries, battery holders for other types of batteries can be provided in the housing or in the battery housing part besides the battery retainer 1.

Figure 6:
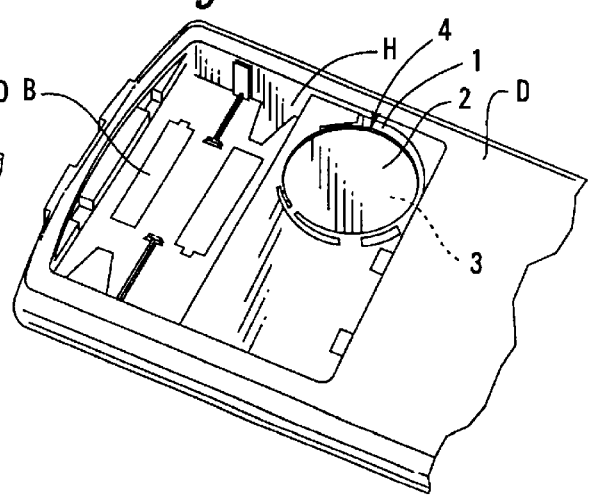
FIG. 6 shows the electric device of FIG. 5, with a battery being received in the battery retainer.

FIG. 6 shows the electric device D of FIG. 5, with a battery 2 being received in the battery retainer 1.

FIG. 6 shows a plan view of a battery retainer 1 according to a preferred embodiment of the present invention. In this embodiment of the battery retainer 1 according to the present invention, the receiving chamber 3 has a shape of a cylinder having a basically circular cross section. The receiving chamber 3 is delimited by a cylindrical outer wall 4. A circular-cylindrical, flat coin battery 2 is received in the receiving chamber 3, so that no spring element and/or contact terminals are visible.

Figure 7:
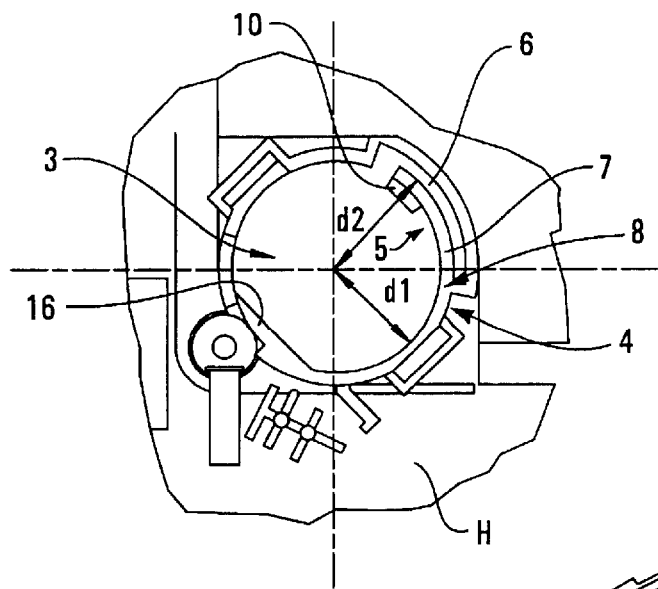
FIG. 7 shows a plan view of a battery retainer according to a preferred embodiment of the present invention, with a battery received therein.

In this preferred embodiment of FIG. 7, the pivotable retaining arm 5 has a curved shape corresponding to the curved shape of the outer wall 4. The pivotable retaining arm 5 includes an elongated part 7 being fixed to the outer wall 4 at its one end 8 and being freely movable at its other end 9. In particular the shape of the elongated part 7 is adapted to the shape of the outer wall 4. The pivotable retaining arm 5 further includes a wedged portion 10 as a push part provided at the free end 9 of the elongated part 7. The wedged portion 10 is offset from the outer wall 4 towards the center of the battery chamber with respect to the circular cross section. This means that, in the plan view of FIG. 7, the push part 10 protrudes from a circular line formed by the outer wall 4 towards the center encircled by said circular line. This means further, that a battery 2 being received in the receiving chamber 3 and having approximately the diameter of the receiving chamber 3 is at least mainly retained by said protruding push part 10.

Alternatively, the entire retaining arm 5 can be radially offset from the outer wall 4 towards the center of the receiving chamber with respect to its circular cross section. Alternatively, the elongated part 7 can at least partly protrude towards the center of the receiving chamber 3, wherein the center is meant to be the center of the circle being formed by the circular-cylindrical outer wall 4.

For insertion and removal of a battery 2, the pivotable retaining arm 5 is radially pivotable off the center of the battery chamber with respect to the circular cross section to at least such an extent that the battery 2 can be inserted or removed.

In this embodiment of the present invention the outer wall 4 includes a curved recess 6 beyond the pivotable retaining arm 5 so that, at a sector of a full circle of the receiving chamber 3 including the recess 6, the receiving chamber 3 has a diameter d2 which is larger than the diameter d1 of the receiving chamber 3 in the remaining sector of a full circle. The recess 6 allows the pivoting of the pivotable retaining arm 5 so that a battery 2 can be inserted or removed. Preferably, the extent of the recess 6 in the direction of the circumference of the receiving chamber 3 is at least slightly larger than the corresponding extent of the retaining arm 5 so that the retaining arm 5 has some clearance with respect to the recess 6.

In the case of the preferred embodiment of FIG. 7, in which only the wedged portion 10 is radially offset towards the center of the receiving chamber 3, the elongated part 7 of the retaining arm 5 is curved to have a diameter of curvature d1 equal to the diameter d1 of the receiving chamber 3 off the recess 6, so that the elongated part 7 and the outer wall 4 off the recess 6 are flush. In this case, the retaining arm 5 needs to be pivoted radially off the center at least to such an extent that the wedged portion 10 no longer protrudes from the recess 6.

Further evident from FIG. 7 is a static retaining element 16 located at the top of the receiving chamber 3. The pivotable retaining arm 5 and the static retaining element 16 are located near opposite edges of the top of the receiving chamber 3.

Figure 9:
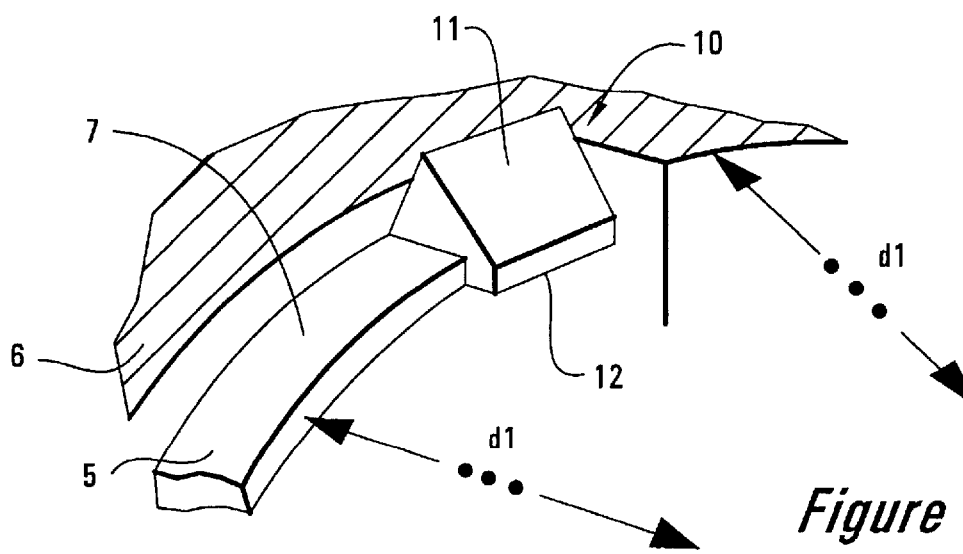
FIG. 9 shows a detailed partial view of the receiving chamber 3 of the battery retainer 1 of FIG. 7, partly showing the retaining arm 5 and the recess 6.

The detailed shape of a preferred push part 10 is depicted in FIG. 9 which shows a detailed partial view of the receiving chamber 3 of the battery retainer 1 of FIG. 7, partly showing the retaining arm 5 and the recess 6. The push part 10 has a sloping top surface 11 radially sloping towards the center of the receiving chamber with respect to the circular cross section, and a flat bottom surface 12 for retaining a received battery 2.

A battery 2 received in the receiving chamber 3 and having about the same diameter d1 as the receiving chamber 3 (of course the diameter of the battery 2 should be slightly smaller) is retained inside the receiving chamber 3 via the part of the flat bottom surface 12 extending into the receiving chamber 3.

The following describes a process of inserting of a battery 2 into the receiving chamber. A battery is slipped under the static retaining element 16 at its one end. The other end of the battery 2 is pressed onto the wedged portion 10. The sloping top surface 11 transforms a static force exerted upon it into a radial pivotal movement of the retaining arm 5 radially off the radial center of the receiving chamber 3. Thus, when the battery 2 is pressed onto the push part 10 to be inserted into the receiving chamber 3, wherein an adequate static force is exerted upon the battery, the retaining arm 5 is automatically radially pivoted away into an outward direction, so that the battery can slip into the receiving chamber 3. Upon full entry of the battery 2 into the receiving chamber 3, the retaining arm 5 snaps back into its position when no force acts upon it. The flat bottom surface 12 therefore comes into contact with the battery 2 at a surface of the battery 2 facing up. The battery 2 is thereby retained in the receiving chamber 3 via the flat bottom surface 12 and the static retaining element 16. For this retaining function, the receiving chamber has a height adapted to the height of the type of battery 2 to be received in the receiving chamber 3.

For removing the battery 2 from the receiving chamber 3, a user presses her/his finger or thumb upon the sloping top surface 11 to pivot the retaining arm 5 towards/into the recess 6 so that the battery 2 comes free from the wedged portion 10 and can be taken out. As is described below, the battery is now at least partly ejected by a spring element 5.

Figure 8:
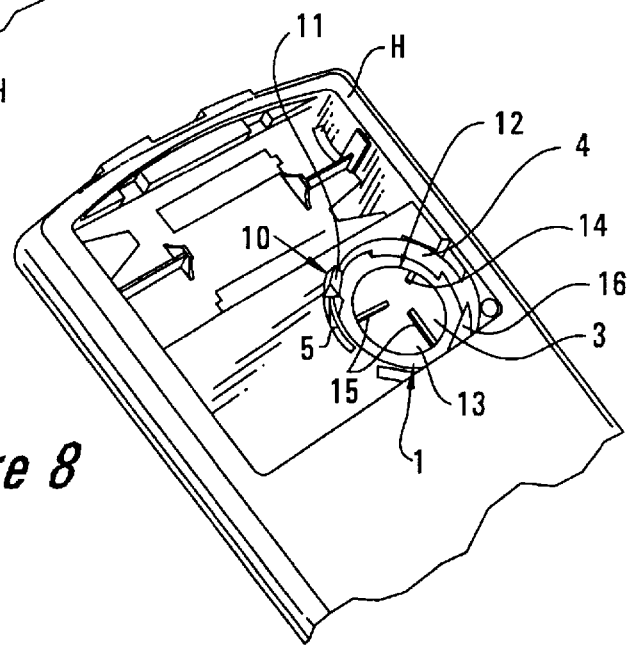
FIG. 8 shows a detailed view of the battery retainer of FIG. 7, being incorporated into an electric device.

FIG. 8 shows a detailed view of the battery retainer 1 of FIG. 7, being incorporated into an electric device D (the latter only partially being shown).

The device D includes a housing H. The battery retainer 1 includes a receiving chamber 3 which is directly incorporated into the housing H as a recess. The receiving chamber 3 has a shape of a cylinder having a basically circular cross section and is delimited by a cylindrical outer wall 4. This shape corresponds to a coin battery 2 to be received in the receiving chamber 3 (i.e. in the recess).

A spring element 5 is located at the bottom of the receiving chamber 3 for ejecting the battery 2 at least partly from the receiving chamber 3, when the pivotable retaining arm 5 is pivoted off, for example as described above in FIG. 9. When the retaining arm 5 is pivoted off by pressing the push part 10, a battery 2 received in the receiving chamber 3 is automatically ejected, or is at its one end at least lifted to an extent that it can easily be removed, e.g. by means of two fingers. In detail, the one end of the battery, which end was previously underneath the retaining arm 5, is lifted, and the other end partly remains underneath the static retaining element 16, and the battery 2 can be taken out via the one lifted end.

In this present embodiment the spring element 13 includes a negative terminal 14 and a positive terminal 15 of the battery retainer 1. The negative terminal 14 and the positive terminal 15 are made of 0.06 mm spring steel so that they function not only as a means for electrically contacting the battery, but at the same time as the spring element for ejecting a battery 2.

The spring element 13, i.e. the negative and the positive terminals 14 and 15 for this embodiment, is/are nickel-plated to prevent corrosion.

What is claimed is:

1. A battery retainer for retaining a battery comprising a positive electrode and a negative electrode, the battery retainer comprising
    a positive terminal for contacting the positive electrode of the battery,
    a negative terminal for contacting the negative electrode of the battery,
    a receiving chamber designed to be adapted to receive a battery and being open at a top,
    a pivotable retaining arm located at a top of the receiving chamber and designed and arranged to hold a battery received in the receiving chamber therein, wherein the pivotable retaining arm is designed to be pivotable by an elastic deformation of the pivotable retaining arm and is made from polycarbonate, and
    a spring element located at a bottom of the receiving chamber and designed and arranged to at least partly eject the battery received in the receiving chamber therefrom upon a pivotal movement of the pivotable retaining arm off the battery.

2. A battery retainer for retaining a battery comprising a positive electrode and a negative electrode, the battery retainer comprising
    a positive terminal for contacting the positive electrode of the battery,
    a negative terminal for contacting the negative electrode of the battery,
    a receiving chamber designed to be adapted to receive a battery and being open at a top, wherein the receiving chamber has a shape of a cylinder having an essentially circular cross section and is delimited by a cylindrical outer wall,
    a pivotable retaining arm located at a top of the receiving chamber and designed and arranged to hold a battery received in the receiving chamber therein, wherein the pivotable retaining arm has a curved shape corresponding to the curved shape of the outer wall and is radially offset from the outer wall towards the center of the battery chamber with respect to the circular cross section, and
    a spring element located at a bottom of the receiving chamber and designed and arranged to at least partly eject the battery received in the receiving chamber therefrom upon a pivotal movement of the pivotable retaining arm off the battery.

3. The battery retainer according to claim 2, wherein the pivotable retaining arm comprises
    an elongated part being fixed to the outer wall at its one end and being freely movable at its other end, and
    a push art provided at the free end of the elongated part,
    wherein, of the pivotable retaining arm, only the push part is offset from the outer wall towards the center of the battery chamber with respect to the circular cross section.

4. The battery retainer according to claim 3, wherein the push part comprises
    a sloping top surface radially sloping towards the center of the receiving chamber with respect to the circular cross section, and
    a flat bottom surface for retaining a received battery,
    wherein the sloping top surface transforms a static force exerted upon it into a radial pivotal movement of the retaining arm radially off the radial center of the receiving chamber.

* * * * *